United States Patent
Li et al.

(10) Patent No.: US 9,554,271 B2
(45) Date of Patent: Jan. 24, 2017

(54) GENERATING KEYS FOR PROTECTION IN NEXT GENERATION MOBILE NETWORKS

(75) Inventors: Changhong Li, Espoo (FI); Dajiang Zhang, Beijing (CN); Mika P. Hietala, Helsinki (FI); Valtteri Niemi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1856 days.

(21) Appl. No.: 11/976,045

(22) Filed: Oct. 19, 2007

(65) Prior Publication Data

US 2008/0184032 A1 Jul. 31, 2008

Related U.S. Application Data

(60) Provisional application No. 60/852,967, filed on Oct. 20, 2006.

(51) Int. Cl.
| | |
|---|---|
| H04L 9/32 | (2006.01) |
| H04W 12/06 | (2009.01) |
| H04L 29/06 | (2006.01) |
| H04W 12/04 | (2009.01) |

(52) U.S. Cl.
CPC ............ *H04W 12/06* (2013.01); *H04L 63/062* (2013.01); *H04L 63/0869* (2013.01); *H04W 12/04* (2013.01)

(58) Field of Classification Search
CPC ..... H04W 12/06; H04W 12/04; H04L 63/062; H04L 63/0869
USPC .......................................... 380/278; 713/171
See application file for complete search history.

(56) References Cited

U.S. PATENT DOCUMENTS

| | | | |
|---|---|---|---|
| 7,586,932 B2 | 9/2009 | Chou et al. | |
| 2001/0017850 A1* | 8/2001 | Kalliokulju et al. | 370/331 |
| 2002/0071558 A1 | 6/2002 | Patel | |
| 2005/0111666 A1 | 5/2005 | Blom et al. | |
| 2005/0176431 A1* | 8/2005 | Herrero Veron | H04L 63/06 455/436 |
| 2006/0171541 A1* | 8/2006 | Horn et al. | 380/278 |
| 2007/0110015 A1* | 5/2007 | Chakraborty et al. | 370/338 |
| 2007/0121947 A1* | 5/2007 | Sood et al. | 380/277 |

FOREIGN PATENT DOCUMENTS

| | | |
|---|---|---|
| CN | 1751533 A | 3/2006 |
| TW | 259693 B | 8/2006 |

OTHER PUBLICATIONS

3rd Generation Partnership Project (3GPP); 3rd Generation Partnership Project; Technical Specification Group Services & System Aspects; Generic Authentication Architecture (GAA); Generic Bootstrapping Architecture (Release 7); pp. 1-69; Mar. 2006.

3rd Generation Partnership Project (3GPP); 3rd Generation Partnership Project; Technical Specification Group Services & System Aspects; 3GPP System Architecture Evolution: Report on Technical Options and Conclusions (Release 7); pp. 1-96; Jan. 2006.

(Continued)

*Primary Examiner* — Saleh Najjar
*Assistant Examiner* — Devin Almeida
(74) *Attorney, Agent, or Firm* — Mintz Levin Cohn Ferris Glovsky and Popeo, P.C.

(57) ABSTRACT

A set of associated keys for an authentication process to be performed in a second network is calculated based on a random value used in an authentication process of a first network.

19 Claims, 3 Drawing Sheets

(56) References Cited

OTHER PUBLICATIONS

3rd Generation Partnership Project (3GPP); 3rd Generation Partnership Project; Technical Specification Group Core Network & Terminals; Numbering, Addressing & Identification (Release 6); pp. 1-50; Sep. 2005.
International Search Report, PCT/EP2007/061223 filed Oct. 19, 2007.
Arunesh Mishra et al., An emperical analysis of the IEEE 802.11 MAC layer handoff process, ACM SIGCOMM, vol. 33, No. 2 (2003).

* cited by examiner

GENERATING KEYS FOR PROTECTION IN NEXT GENERATION MOBILE NETWORKS

CROSS REFERENCE TO RELATED APPLICATION

This application claims priority of U.S. Provisional Patent Application No. 60/852,967, filed on Oct. 20, 2006. The subject matter of this earlier filed application is hereby incorporated by reference.

FIELD AND BACKGROUND OF THE INVENTION

The present invention relates to the field of 3GPP (Third Generation Partnership Project) Long Term Evolution/System Architecture Evolution (LTE/SAE). In particular, the invention relates to generation of keys such as Ciphering Keys (CKs) and Integrity protection Keys (IKs) in 3GPP LTE/SAE.

3GPP LTE/SAE requires separate keys used for AS (Access Stratum), NAS (Non-Access Stratum), and U-plane (User-plane) protection.

In UMTS (Universal Mobile Telecommunication System) a security mechanism is provided using an AKA (Authentication and Key Agreement) protocol based on a 'challenge-response' strategy, in which a ciphering key and an integrity protection key are obtained using a random value RAND.

SUMMARY OF THE INVENTION

For example, in case a UE (User Equipment) hands over from a 2G/3G (second Generation/third Generation) communication system to LTE, there should be a way to derive the keys for AS, NAS, and U-plane.

In other words, separate keys for NAS signalling protection between UE (User Equipment) and MME (Mobility Management Element) and for user plane protection between UE and UPE are needed. In addition, a different key for protecting RRC signalling used between eNB and UE is also needed.

According to an aspect of the present invention, a method is provided, comprising:

calculating a set of associated keys for an authentication process to be performed in a second network based on a random value used in an authentication process of a first network.

The first network may be a 2G/3G communication system, and the second network may be the LTE.

The associated keys may be the keys for AS, NAS, and U-plane.

According to an embodiment of the invention, a set of associated random values to be used in the authentication process of the second network may be calculated based on the random value used in the authentication process of the first network, and the set of associated keys may be calculated based on the set of associated random values.

The set of associated random values may be calculated based on the random value using identities of network entities of the second network, the network entities being associated through the authentication process to be performed in the second network.

According to another embodiment of the invention, keys of an authentication process of the first network are calculated based on the random value, and the set of associated keys is calculated based on the keys using identities of network entities of the second network, the network entities being associated through the authentication process to be performed in the second network.

The random value of the first network may be obtained during a handover process of a user equipment from the first network to the second network. The random value of the first network may also be obtained during an authentication process performed in the second network.

The network entities may comprise at least one of a base station, a mobility management element and a user plane element.

The set of associated keys may comprise a set of associated ciphering keys and a set of associated integrity protections keys.

The set of associated keys may comprise a key used for access stratum protection, a key used for non-access stratum protection, and a key used for user-plane protection.

FIG. 1 shows a schematic block diagram illustrating a user equipment and network devices according to an embodiment of the invention.

A network device 30 such as an MME (Mobility Management Element) comprises a receiving unit 31 and a calculating unit 32.

The MME 30 may also comprise a transmitting unit 33. The receiving unit 31 receives a random value, such as RAND, used in an authentication process of a first network, such as a 2G/3G communication system. The calculating unit 32 calculates a set of associated keys, such as keys for AS, NAS and U-plane, for an authentication process to be performed in a second network, such as LTE, based on the random value.

The receiving unit 31 may receive keys of the authentication process of the first network, such as CK and IK.

The receiving unit 31 may receive the random value and the keys from a home subscriber server. Alternatively, the receiving unit 31 may receive the random value and the keys from an other network element of the first network, and the transmitting unit 33 may transmit the keys to the home subscriber server. The receiving unit 31 then may receive modified keys, such as $CK_{HO}$ and $IK_{HO}$, of the authentication process of the first network from the home subscriber server, and the calculating unit 32 may calculate the set of associated keys based on the modified keys.

The calculating unit 32 may calculate the set of associated keys using identities of network entities of the second network, the network entities being associated through the authentication process to be performed in the second network, wherein the network entities include said network device.

According to an alternative embodiment, the transmitting unit 33 transmits the identities of the network entities of the second network to the home subscriber server, and the receiving unit 31 receives a set of associated keys for the authentication process to be performed in the second network from the home subscriber server. The receiving unit 31 may receive the random value beforehand from an other network element of the first network, and the transmitting unit 33 may transmit also the random value to the home subscriber server. The transmitting unit 33 may transmit the identities of the network entities towards said network entities.

A network device 20 shown in FIG. 1, such as an SGSN, comprises a transmitting unit 21 which transmits the random value used in the authentication process of the first network to a network device, such as the MME 30, of the second network during a handover process of a user equipment 10 from the first network to the second network. The transmitting unit 21 may also transmit the keys of the authentication process of the first network to the network device of the second network.

The user equipment (UE) 10 shown in FIG. 1 comprises a receiving unit 11 which receives the identities of the network entities of the second network, and a calculating unit 12 which calculates a set of associated keys for the authentication process to be performed in the second network using the identities of the network entities. The UE 10 may receive the identities from the MME 30. The identities may be received during an initial access towards the second network and/or during a handover process of the UE 10 from the first network to the second network.

A network device such as an eNB or eRAN (evolved Radio Access Network) 50 shown in FIG. 1 comprises a calculating unit 51 which calculates a set of associated keys for the authentication process to be performed in the second network using identities of network entities of the second network, the network entities being associated through the authentication process to be performed in the second network, wherein the network entities include said network device 50.

Finally, a network device such as an HSS 40 shown in FIG. 1 comprises a receiving unit 41 which receives the keys of the authentication process of the first network, a calculating unit 42 which calculates modified keys based on the keys, and a transmitting unit 43 which transmits the modified keys to a network element of the second network, such as the MME 30. The keys may be received by the receiving unit 41 from the MME 30.

According to an alternative embodiment, the receiving unit 41 receives the random value used in the authentication process of the first network and the identities of network entities of the second network, the network entities being associated through an authentication process to be performed in the second network, the calculating unit 42 calculates a set of associated keys for the authentication process to be performed in the second network based on the random value using the identities, and the transmitting unit 43 transmits the set of associated keys to a network element of the second network, such as the MME 30. The random value and the identities may be received by the receiving unit 41 from the MME 30.

According to a further embodiment, the transmitting unit 43 of the HSS 40 transmits the random value and the keys of the authentication process of the first network to the MME 30, e.g. upon an authentication data request transmitted from the transmitting unit 33 of the MME 30 to the HSS 40.

It is to be noted that the network devices and terminal and the user equipment shown in FIG. 1 may have further functionality for working e.g. as SGSN, MME, eRAN, HSS and UE. Here the functions of the network devices and user equipment relevant for understanding the principles of the invention are described using functional blocks as shown in FIG. 1. The arrangement of the functional blocks of the network devices and the user equipment is not construed to limit the invention, and the functions may be performed by one block or further split into sub-blocks.

For the purpose of the present invention to be described herein below, it should be noted that method steps likely to be implemented as software code portions and being run using a processor at one of the network devices or the terminal are software code independent and can be specified using any known or future developed programming language;

method steps and/or units likely to be implemented as hardware components at one of the network devices or the terminal are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

The present invention provides an extension which does not require changes to the AKA protocol.

According to an embodiment of the invention, also no changes to a home subscriber server are required.

DESCRIPTION OF THE PREFERRED EMBODIMENTS

Figure 1:
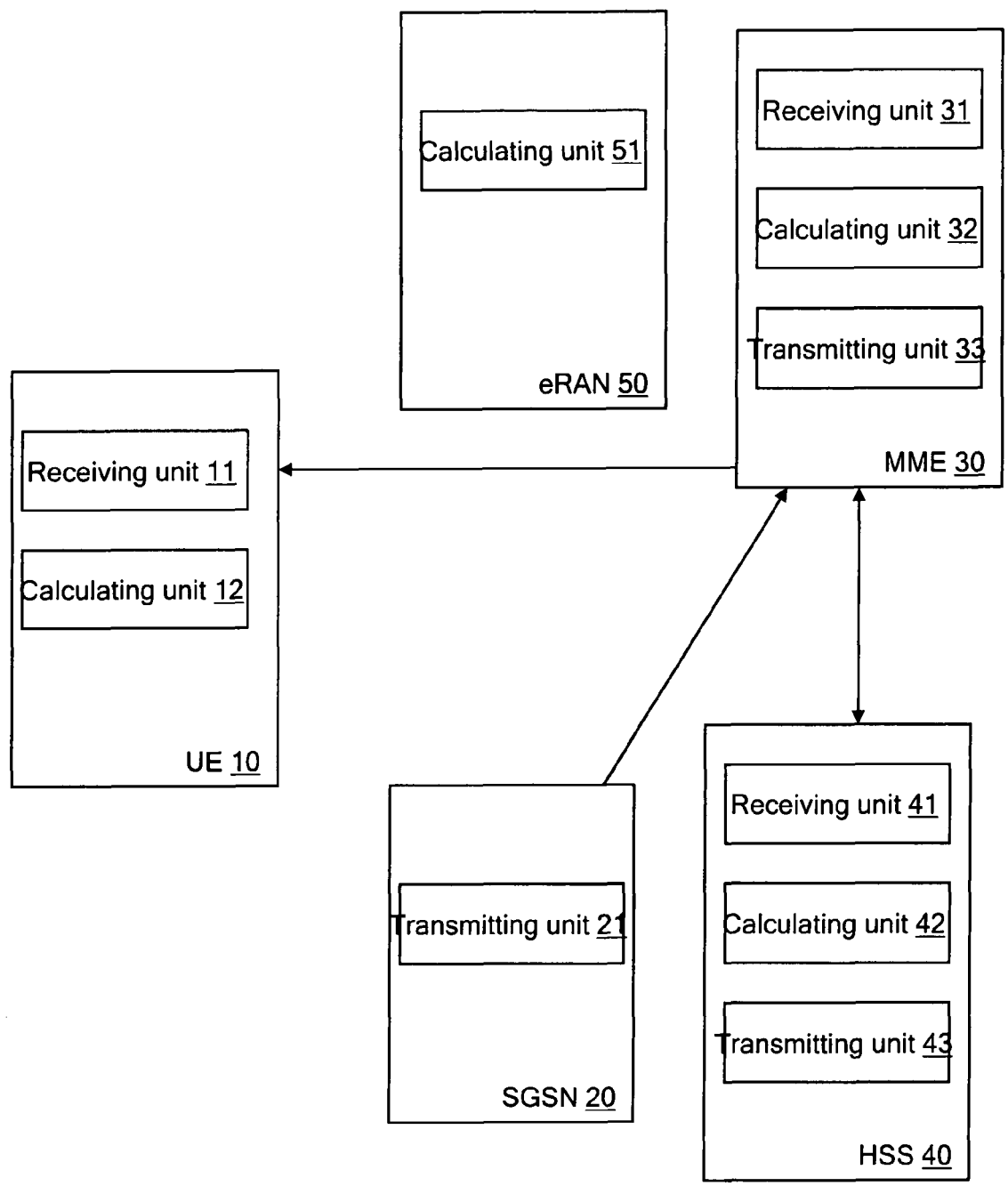
FIG. 1 shows a schematic block diagram illustrating a user equipment and network elements according to an embodiment of the invention.

For generating separate keys for AS, NAS and U-plane protection, according to a solution (1) a longer random value RAND (i.e. 3 times longer than RAND used in UMTS) is used, which can be sectioned into RANDrrc, RANDnas and RANDupe.

$$RAND = RAND{rrc} \| RAND{nas} \| RAND{upe}$$

The separate ciphering keys and integrity protection keys for AS, NAS and U-plane can then be calculated as follows:

$$CK{rrc} = f3(K, RAND{rrc})$$

$$CK{nas} = f3(K, RAND{nas})$$

$$CK{upe} = f3(K, RAND{upe})$$

$$IK{rrc} = f4(K, RAND{rrc})$$

$$IK{nas} = f4(K, RAND{nas})$$

$$IK{upe} = f4(K, RAND{upe})$$

wherein CKrrc is the ciphering key for AS, CKnas is the ciphering key for NAS and CKupe is the ciphering key for U-plane, IKrrc is the integrity protection key for AS, IKnas is the integrity protection key for NAS and IKupe is the integrity protection key for U-plane. f3 and f4 are functions for generating the above key sets and may be predetermined in advance. K in the above formulas may be a ciphering key or integrity protection key itself or a predetermined parameter.

However, preferably the length of RAND is the same as in UMTS. According to an embodiment of the invention presented by solution (2), RAND is used together with different AS, NAS and U-plane identities to generate RANDrrc, RANDnas and RANDupe.

$RAND_{rrc} = KDF(RAND, ID_{as})$ $RAND_{nas} = KDF(RAND, ID_{nas})$ $RAND_{upe} = KDF(RAND, ID_{upe})$ For example, KDF can be an XOR function, IDas can be the identity of a BS (Base Station) or eNB (evolved Node B), IDnas can be the identity of an MME (Mobility Management Element) and IDupe can be the identity of a UPE (User Plane Element).

Then RANDrrc, RANDnas and RANDupe are used to generate the corresponding CKs and IKs for AS or RRC (Radio Resource Control), NAS and U-plane.

$CK_{rrc} = f3(K, RAND_{rrc})$ $CK_{nas} = f3(K, RAND_{nas})$ $CK_{upe} = f3(K, RAND_{upe})$ $IK_{rrc} = f4(K, RAND_{rrc})$ $IK_{nas} = f4(K, RAND_{nas})$ $IK_{upe} = f4(K, RAND_{upe})$ wherein CKrrc is the ciphering key for AS or RRC, CKnas is the ciphering key for NAS and CKupe is the ciphering key for U-plane, IKrrc is the integrity protection key for AS, IKnas is the integrity protection key for NAS and IKupe is the integrity protection key for U-plane. f3 and f4 are functions for generating the above key sets and may be predetermined in advance. K in the above formulas may be a ciphering key or integrity protection key itself or a predetermined parameter.

According to an alternative embodiment of the invention presented by solution (3), CK and IK are generated from K and RAND as in UMTS and are used to derive the CKs and IKs used for AS, NAS and U-plane.

$CK_{rrc} = f3(CK, ID_{as})$ $CK_{nas} = f3(CK, ID_{nas})$ $CK_{upe} = f3(CK, ID_{upe})$ $IK_{rrc} = f4(IK, ID_{as})$ $IK_{nas} = f4(IK, ID_{nas})$ $IK_{upe} = f4(IK, ID_{upe})$ wherein CKrrc is the ciphering key for AS or RRC, CKnas is the ciphering key for NAS and CKupe is the ciphering key for U-plane, IKrrc is the integrity protection key for AS, IKnas is the integrity protection key for NAS and IKupe is the integrity protection key for U-plane. f3 and f4 are functions for generating the above key sets and may be predetermined in advance, and IDas can be the identity of a BS or eNB, IDnas can be the identity of an MME and IDupe can be the identity of a UPE.

According to a further alternative to solutions (1) and (2) as described above, the IKs can also be generated through a function f2 as defined in UMTS.

The CK and IK should be kept in MME as will be described later on and shall not be transmitted to other network elements.

As CK and IK are a product of AKA authentication protocol (challenge-response), for solution (1) an HSS (Home Subscriber Server) only needs to generate a longer RAND as a part of authentication vector and the RAND will be sectioned at MME into RANDrrc, RANDnas and RANDupe.

For solution (2) a key derivation function is required to generate RANDrrc, RANDnas and RANDupe, and IDas, IDnas and Idupe have to be defined.

Figure 2:
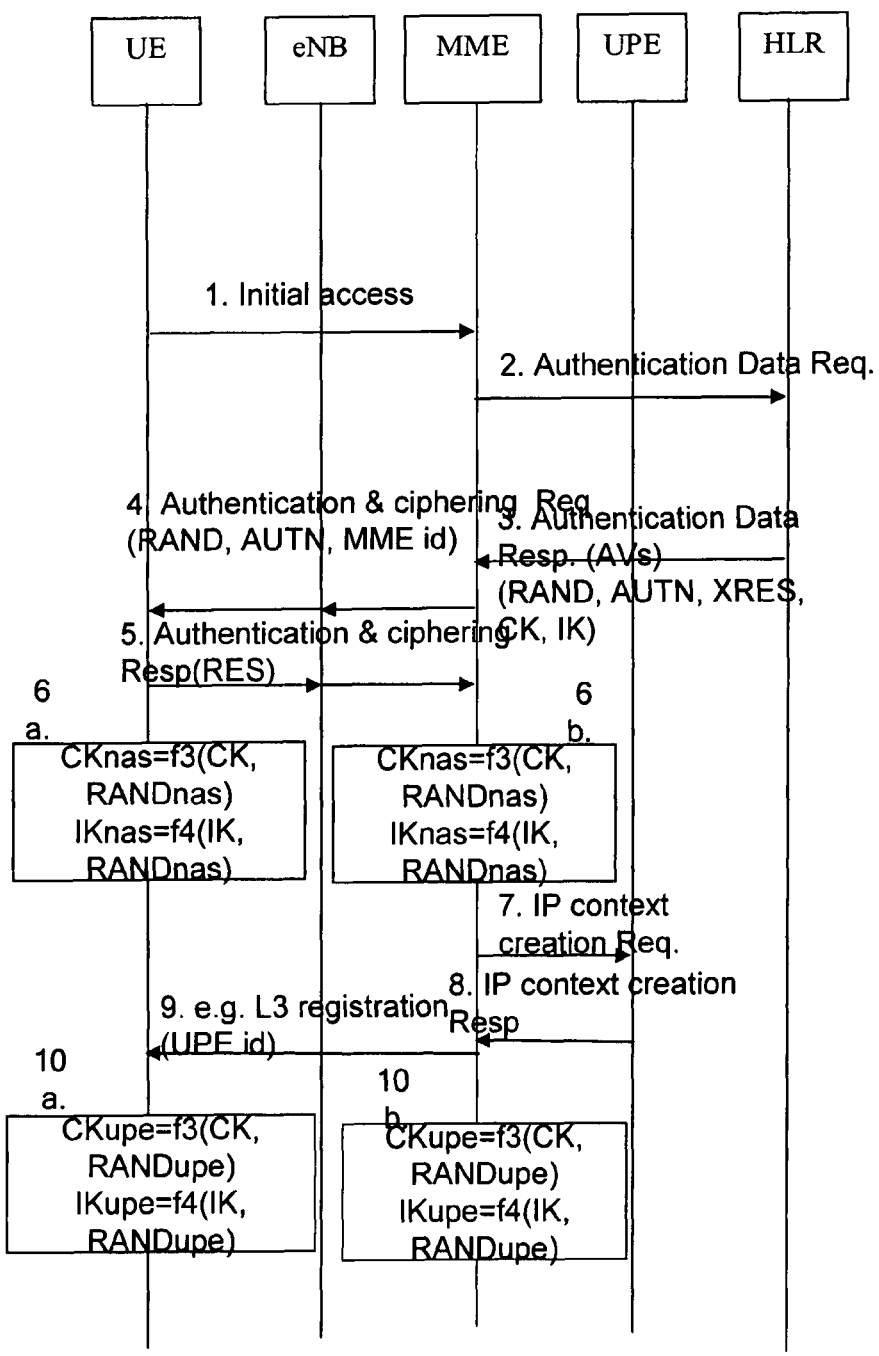
FIG. 2 shows a signalling diagram illustrating key generation according to the present invention during an initial access.

FIG. 2 shows a signalling diagram illustrating key generation according to the present invention during an initial access.

In an initial access towards an SAE/LTE system, a UE issues an initial access request to an MME of the SAE/LTE system (communication 1 in FIG. 2). In a communication 2 the MME sends an authentication data request to a HLR (Home Location Register) or HSS which is a database located in a home network of the UE, and receives authentication vectors (AVs) and a random value RAND, a ciphering key CK and an integrity protection key IK, AUTN (authenticator for the challenge (AUTN), and XRES (expected response) in an authentication data response from the HLR in communication 3.

In a communication 4 in FIG. 2, the MME sends authentication & ciphering requests towards the UE via an eNB, the request including the random value RAND and an identity of the MME, MMEid, as well as AUTN. In a communication 5 in FIG. 2, the UE responds with an authentication & ciphering response RES, which is transmitted towards the MME via the eNB.

After successful authentication, MME and UE will use agreed CK, IK with currently used RAND as roof key to create second level keys for protection, CKnas and IKnas in blocks 6b and 6a in FIG. 2, as described above.

In communication 7 in FIG. 2 the MME sends an IP context creation request to an UPE, which is acknowledged in communication 8, and in communication 9 the MME sends an L3 registration including an identity of the UPE, UPEid, to the UE. Then, in blocks 10a and 10b the UE and the MME use the agreed CK, IK with currently used RAND as roof key to create second level keys for protection, CKupe and IKupe, as described above.

The same principle applies for RRC key generation in UE and MME. UE and MME use an identity of the eNB, eNBid, to derive the RRC keys CKrrc and IKrrc as described above. The key derive functions are UMTS functions f3 and f4.

In particular, referring to solution (2) described above, UE and MME should be able to derive CKnas, IKnas, CKup, IKup, CKrrc, IKrrc by using existing UMTS function f3 and f4 after each successful authentication.

$RAND_{rrc} = KDF(RAND, ID_{as})$ $RAND_{nas} = KDF(RAND, ID_{nas})$ $RAND_{upe} = KDF(RAND, ID_{upe})$ whereby:
KDF=RAND XOR IDs
IDs are MME id (used in NAS protection), UPE id (used in UP protection), or eNB id (used in RRC protection);

$CK_{rrc} = f3(K, RAND_{rrc})$ $CK_{nas} = f3(K, RAND_{nas})$ $CK_{upe} = f3(K, RAND_{upe})$ $IK_{rrc} = f4(K, RAND_{rrc})$ $IK_{nas} = f4(K, RAND_{nas})$ $IK_{upe} = f4(K, RAND_{upe})$ whereby: K=CK/IK An alternative of using f3/f4 is to reuse KDF defined in TS33.220 Annex B, i.e., SAE_keys=KDF (Ks, "static string", RAND, IMPI, SAE_ids). Ks is generated by concatenating CK and IK. IMPI (IP Multimedia Private Identity) could be obtained from the IMSI (International Mobile Subscriber Identity) as specified in TS 23.003. SAE_ids could be e.g. MME_id, eNB id and UPE_id or MME's, eNB's and UPE's names. SAE_keys will express then MME_key, UPE_key, RRC_key. "static string" could be "LTE_CK" and "LTE_IK" to generate CKs and IKs.

In a handover process between a 2G/3G system and an SAE/LTE system, the distribution of security data (unused authentication vectors and/or current security context data, e.g. used CK, IK, RAND etc.) is performed between SGSNs (2G/3G) and MME. The following cases are distinguished with respect to the distribution of security data between them.

Case 1, Inter-RAT (Radio Access Technology) Handover (with separate 3GPP anchor): LTE to 2G/3G: UMTS and GSM authentication vectors can be distributed between MME and 2G/3G SGSN. Note that originally all authentication vectors (quintets for UMTS/SAE subscribers and triplets for GSM subscribers) are provided by the HLR/AuC (Authentication Center). Current security context data can be distributed between MME and 2G/3G SGSN. MME should be able to make conversion CK, IK→Kc and XRES→SES.

Figure 3:
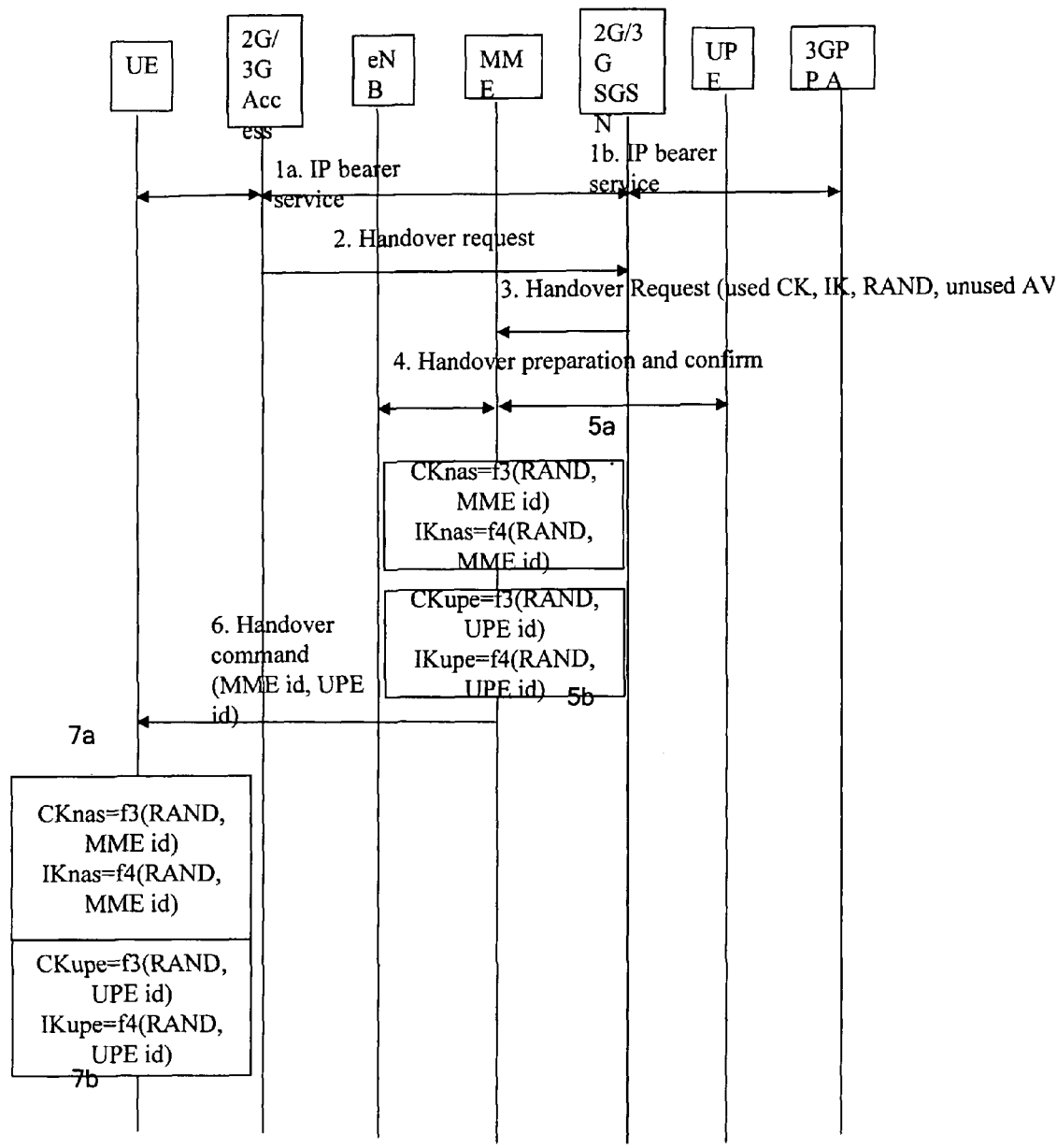
FIG. 3 shows a signalling diagram illustrating key distribution/conversion during a handover procedure from a 2G/3G communication system to LTE.

Case 2, Inter-RAT Handover (with separate 3GPP anchor): 2G/3G→LTE:

The high level signaling for this case is illustrated in FIG. 3.

As shown by communication 1a and 1b in FIG. 3, an IP (Internet Protocol) bearer service is established between the UE, a 2G/3G Access node, a 2G/3G SGSN and a 3GPP Application. In communication 2 in FIG. 3 a handover request is issued from the 2G/3G Access node to the 2G/3G SGSN.

Subsequently, during handover preparation time, the 2G/3G SGSN distributes security data to the MME (communication 3 in FIG. 3). The security data include currently used CK, IK and RAND as well as unused AVs.

After received confirmation from eNB (communication 4 in FIG. 3), the MME generates three separate keys for NAS, UPE (blocks 5a, 5b in FIG. 3) and RRC (not shown in FIG. 3). The MME also delivers MME id, UPE id to the UE with e.g. handover command (communication 6 in FIG. 3). Thus, the UE is able to generate the same keys for NAS, UPE as well (blocks 7a, 7b in FIG. 3).

In addition to above cases, in an MME to MME handover in a PLMN (Public Land Mobile Network), security data can be distributed in such case without change.

According to the present invention, when a UE hands over from 2G/3G communication system to LTE, according to an embodiment of the invention represented by a solution (a), a 2G/3G SGSN (Serving GPRS (General Packet Radio Service) Support Node) sends a current RAND used in the 2G/3G communication system together with a CK/IK derived from the current RAND in the 2G/3G communication system to an MME in communication 3 in FIG. 3. The MME then uses f3 and f4 to generate different key sets with identities of AS, NAS and U-plane as described above. The K in the formula will be CK or IK.

The identities of MME and UPE can be sent to the UE through a handover command as shown in communication 6 in FIG. 3. The UE can also generate corresponding CK/IK sets for NAS and UPE. The same principle applies to AS except that the MME does not need to send the AS ID to the BS, RRC or eNB. New functions fx and fy may be defined to generate the key sets for RRC, MME and UPE. If f3 and f4 are reused, the UE should distinguish when to use them to generate CK/IK and when to use them to generate the key sets for RRC, MME and UPE.

According to an alternative embodiment presented by a solution (b), there are several more steps compared to solution (a) to derive a variant of the CK/IK received from the SGSN. The CK/IK derived from the SGSN will be sent from the MME to an HSS of the UE and will be used as RAND to derive a pair of new CK and IK, $CK_{HO}$ and $IK_{HO}$, through f3 and f4, i.e., $CK_{HO}$=f3 (K, CK) and $IK_{HO}$=f4 (K, IK). These $CK_{HO}$ and $IK_{HO}$ will be used to generate the CK/IK sets for AS, NAS and UPE in the MME, the UE and the AS entity (i.e. the BS, RRC or eNB). The corresponding $CK_{HO}$ and $IK_{HO}$ can also be generated in UE/USIM (UMTS Subscriber Identity Module) and in the AS entity.

According to a further alternative embodiment represented by a solution (c), when the UE hands over from 2G/3G communication system to LTE, the 2G/3G SGSN sends the currently used RAND to the MME in communication 3 in FIG. 3 similar to solution (a). The MME then sends this RAND together with identities of MME (NAS), AS and UPE (U-plane) to the HSS of the UE and asks for authentication vectors. The HSS uses this RAND and the identities of AS, NAS and U-plane to generate new authentication vectors (CKnas IKnas, Ckrrc, IKrrc, etc. as described above), and sends them back to the MME. The K in the formula is then a permanent K stored in HSS and USIM. The identities of MME and UPE can be sent to the UE through the handover command as shown in communication 6 in FIG. 3. The UE can also generate corresponding CK/IK sets for NAS and UPE. The same principle applies to AS, except that the MME does not need to send the AS ID to eNB.

According to solution (c), the random value RAND used to generate CK/IK in 2G/3G communication system needs to be sent to HSS from MME. According to solutions (a) to (c), the identities of at least MME and UPE need to be sent to UE through the handover command. f3 and f4 are used to generate the key sets for the use in LTE.

For solution (a) MME and UE need to implement f3 and f4 or similar functions called fx and fy. For solution (b) there are more steps to generate $CK_{HO}$ and $IK_{HO}$. For solution (c) the HSS needs to be modified to generate longer authentication vectors.

According to solution (a) there is no change to HSS. However, solution (c) is more secure. The disclosure of the CK/IK in 2G/3G will not affect the CK/IK sets used in LTE. Solution (b) is also secure because the CK/IK will not cause the disclosure of the CK/IK sets used in LTE.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. A method comprising:
   obtaining first keys of a first authentication process of a first radio access network during a handover process of a user equipment from the first radio access network to a second radio access network, wherein the first keys of the first authentication process of the first radio access network are produced based on a random value used in the first authentication process of the first radio access network; and producing second keys for a second authentication process to be performed in the second radio access network having a different radio access technology to the first radio access network, the second keys produced based on the first keys of the first authentication process of the first radio access network and identities of network entities of the second radio access network, wherein the network entities are associated through the second authentication process to be performed in the second radio access network, and wherein the second keys include keys for ciphering, integrity protection, access stratum protection, non-access stratum protection and user-plane protection.

2. The method of claim 1, wherein the network entities comprise at least one of a base station, a mobility management element and a user plane element.

3. The method of claim 1, wherein the second radio access network comprises a long term evolution cellular network.

4. An apparatus comprising:
at least one processor; and
at least one memory including computer program code, the at least one processor, the at least one memory, and the computer program code configured to cause the apparatus to at least:
receive first keys of a first authentication process of a first radio access network during a handover process of a user equipment from the first radio access network to a second radio access network, wherein the first keys of the first authentication process of the first radio access network are produced based on a random value used in the authentication process of the first radio access network; and
calculate second keys for a second authentication process to be performed in the second radio access network based on the first keys obtained in the authentication process of the first radio access network and identities of network entities of the second radio access network, wherein the network entities are associated through the second authentication process to be performed in the second radio access network, the first radio access network and the second radio access network comprising different radio access technologies, and wherein the associated keys include keys for ciphering, integrity protection, access stratum protection, non-access stratum protection and user-plane protection.

5. The apparatus of claim 4, wherein the apparatus is further configured to at least:
transmit the first keys to a home subscriber server;
receive modified keys of the authentication process of the first radio access network from the home subscriber server; and
calculate the second keys based on the modified keys.

6. The apparatus of claim 4, wherein the apparatus transmits the identities of the network entities towards said network entities.

7. The apparatus of claim 4, wherein the second radio access network comprises a long term evolution cellular network.

8. An apparatus comprising:
at least one processor; and
at least one memory including computer program code, the at least one processor, the at least one memory, and the computer program code configured to cause the apparatus to at least:
transmit first keys of a first authentication process of a first radio access network to a network device of a second radio access network during a handover process of a user equipment from the first radio access network to the second radio access network, wherein the first keys of the first authentication process of the first radio access network are produced based on a random value used in the authentication process of the first radio access network, wherein the transmitted keys and identities of network entities of the second radio access network are to be used by the network device of the second radio access network to calculate second keys for a second authentication process to be performed in the second radio access network, wherein the network entities are associated through the second authentication process to be performed in the second radio access network, the first radio access network and the second radio access network comprising different radio access technologies, and wherein the second keys include keys for ciphering, integrity protection, access stratum protection, non-access stratum protection and user-plane protection.

9. The apparatus of claim 8, wherein the second radio access network comprises a long term evolution cellular network.

10. An apparatus comprising:
at least one processor; and
at least one memory including computer program code, the at least one processor, the at least one memory, and the computer program code configured to cause the apparatus to at least:
receive identities of network entities of a second radio access network, during a handover process of a user equipment from a first radio access network to the second radio access network, the network entities being associated through an authentication process to be performed in the second radio access network; and
calculate associated keys for the authentication process to be performed in the second radio access network using the identities of the network entities, the first radio access network and the second radio access network comprising different radio access technologies, wherein the associated keys include keys for ciphering, integrity protection, access stratum protection, non-access stratum protection and user-plane protection.

11. The apparatus of claim 10, wherein the second radio access network comprises a long term evolution cellular network.

12. An apparatus comprising:
at least one processor; and
at least one memory including computer program code, the at least one processor, the at least one memory, and the computer program code configured to cause the apparatus to at least:
receive first keys of a first authentication process of a first radio access network;
calculate modified keys based on the keys; and
transmit the modified keys to a network element of a second radio access network in which a second authentication process is to be performed, during a handover process of a user equipment from the first radio access network to the second radio access network, wherein the modified keys are to be used by the network element of the second radio access network to calculate second keys for the second authentication process to be performed in the second radio access network, the first radio access network and the second radio access network comprising different radio access technologies, and wherein the second keys include keys foe ciphering, integrity protection, access stratum protection, non-access stratum protection and user-plane protection.

13. The apparatus of claim 12, wherein the apparatus is further configured to at least:
receive identities of network entities of a second radio access network, the network entities being associated through the second authentication process to be performed in the second radio access network
calculate second keys for the second authentication process to be performed in the second radio access network based on the modified keys using the identities of network entities of the second radio access network, wherein the first keys of the first authentication process of the first radio access network are produced based on a random value used in the authentication process of the first radio access network, and transmits the second keys to a network element of the second radio access network, the first radio access network and the second radio access network comprising different radio access technologies.

14. The apparatus of claim 12, wherein the apparatus is further configured to at least:
receive an authentication data request for the ether second authentication to be performed in the second radio access network, and
transmit the first keys of the first authentication process of the first radio access network upon the authentication data request, wherein the first keys of the first authentication process of the first radio access network are produced based on the random value used in the authentication process of the first radio access network, the first radio access network and the second radio access network comprising different radio access technologies.

15. The apparatus of claim 12, wherein the second radio access network comprises a long term evolution cellular network.

16. A computer program product embodied on a non-transitory machine-readable storage device that includes executable instructions for causing a computer system to provide operations comprising:
obtaining first keys of a first authentication process of a first radio access network during a handover process of a user equipment from the first radio access network to a second radio access network, wherein the first keys of the first authentication process of the first radio access network are produced based on a random value used in the authentication process of the first radio access network; and
producing second keys for a second authentication process to be performed in the second radio access network based on the first keys of the first authentication process of the first radio access network and identities of network entities of the second radio access network, wherein the network entities are associated through the second authentication process to be performed in the second radio access network, the first radio access network and the second radio access network comprising different radio access technologies, and wherein the second keys include keys for ciphering, integrity protection, access stratum protection, non-access stratum protection and user-plane protection.

17. The computer program product embodied on the non-transitory machine-readable storage device of claim 16, wherein the second radio access network comprises a long term evolution cellular network.

18. A method comprising:
receiving identities of network entities of a second radio access network, the network entities being associated through a second authentication process performed in the second radio access network;
receiving a random value obtained from a first authentication process of a first radio access network;
calculating associated random values to be used in the second authentication process of the second radio access network based on the random value and the identities of network entities of the second radio access network;
calculating, at a node of the second radio access network, second keys for the second authentication process performed in the second radio access network based on the associated random value, wherein the second keys include keys for ciphering, integrity protection, access stratum protection, non-access stratum protection and user-plane protection; and
performing, at the node of the second radio access network, the second authentication process based on the second keys, the first radio access network and the second radio access network comprising different radio access technologies.

19. The method of claim 18, wherein the second radio access network comprises a long term evolution cellular network.

* * * * *